UNITED STATES PATENT OFFICE.

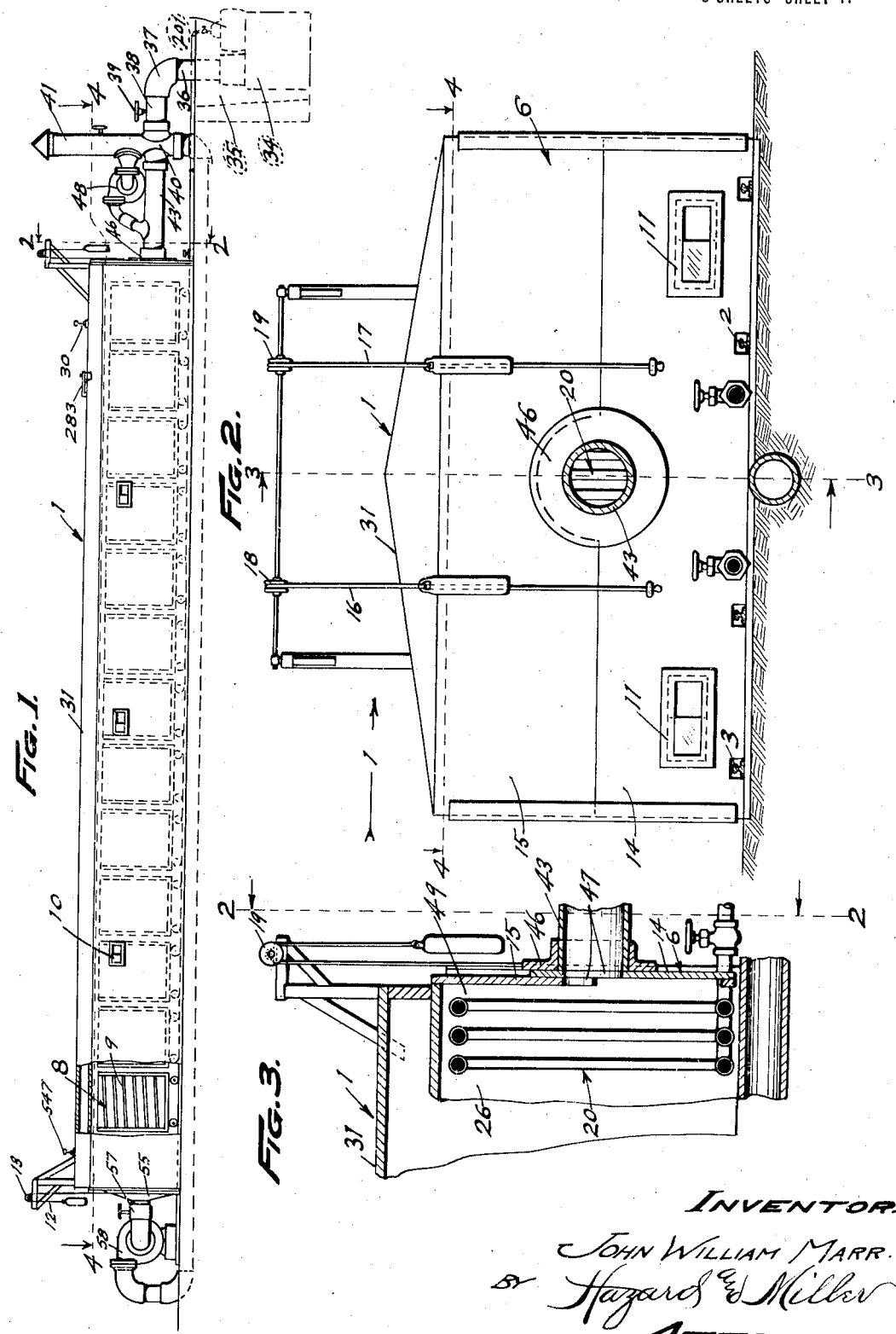

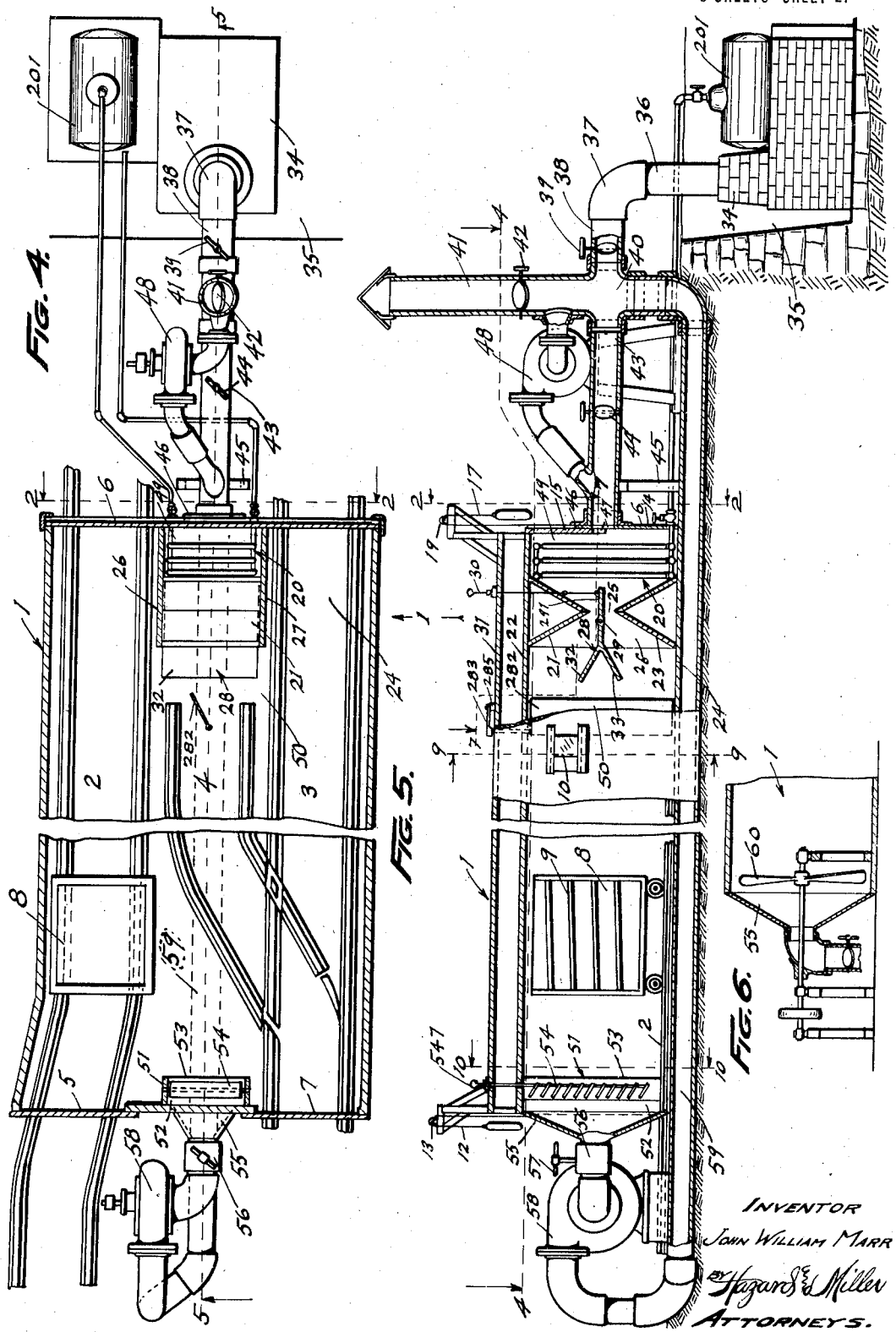

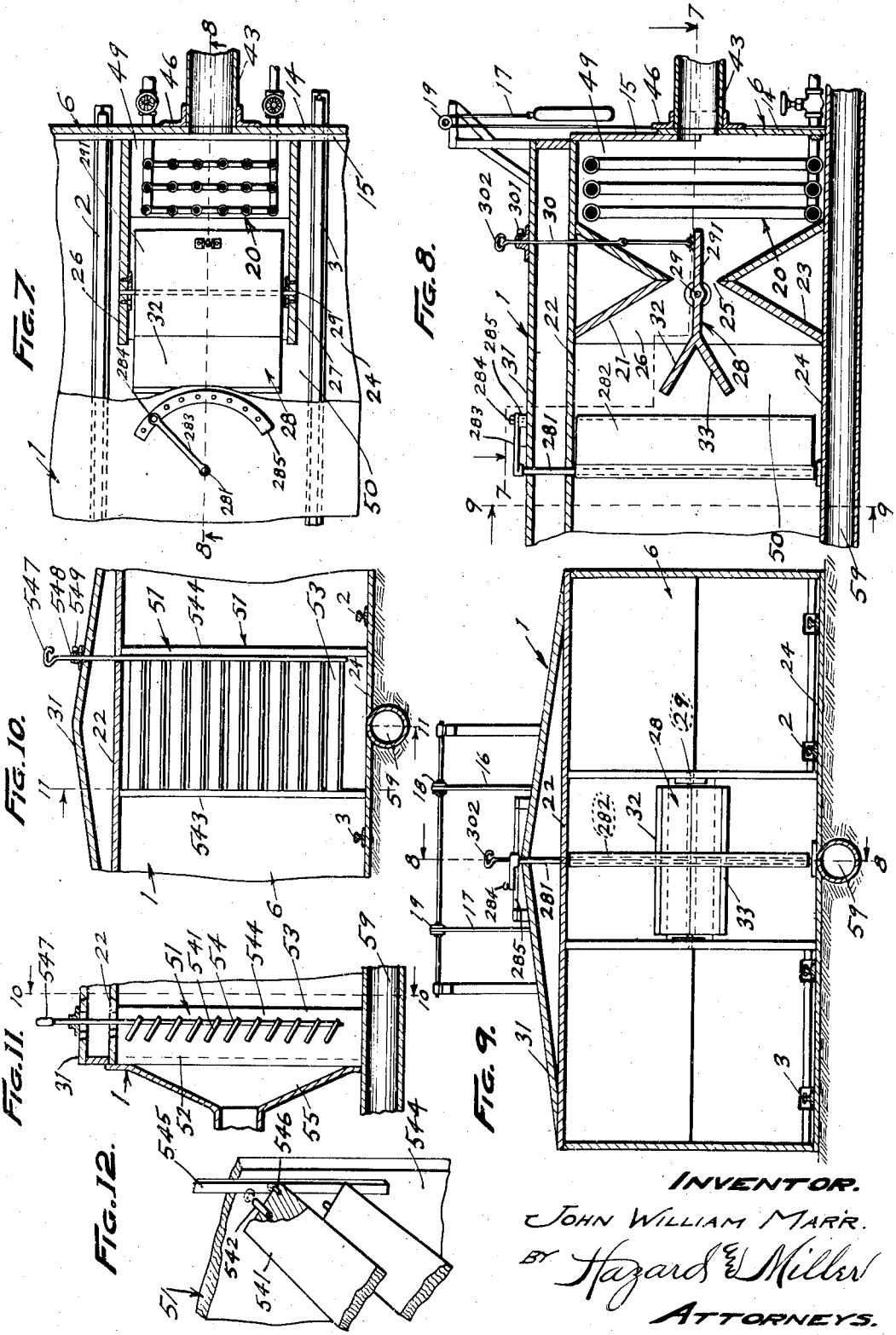

JOHN W. MARR, OF LONG BEACH, CALIFORNIA.

APPARATUS FOR SMOKING FISH.

1,345,095.  Specification of Letters Patent.  Patented June 29, 1920.

Application filed July 25, 1919. Serial No. 313,317.

*To all whom it may concern:*

Be it known that I, JOHN WILLIAM MARR, a citizen of the United States, residing at Long Beach, in the county of Los Angeles and State of California, have invented new and useful Improvements in Apparatus for Smoking Fish, of which the following is a specification.

My object is to make an improved apparatus for smoking fish, and my invention consists of the novel features herein shown, described and claimed.

My invention relates to the art of preparing smoked fish of all kinds for canning and kippering.

The pilchard or large sardine is a fish caught in large quantities along the coast of southern California and ranging in size from six to twelve inches. The large ones are very fat in their season and full of blood.

In the present art it takes five or six hours to fill the smoke house with fish by hand, then five or six hours more to dry the fish and finally five or six hours more to smoke the fish making fifteen to twenty hours altogether that the fish are in the smoke house and all this time the fish are subjected to more or less heat and this heat warms the blood of the fat fish along the back bones. When these fish are canned the blood forms a gas which swells the cans and the contents of the cans have a bitter smoky taste.

In the old process the fires are built directly under the trays containing the fish and the smoke is more or less confined, and during the drying period the top fish are lying in damp dead smoke and it is this damp dead smoke which causes the bitter taste, turns the fish dark, and causes them to stick together in the can. In the old process the fish are dried and smoked with the same fires, that is the smoking process begins with the drying process.

It is the object of my invention to eliminate these objectionable features, and with my apparatus properly operated the fish are first dried with warm fresh air and then the live smoke is turned on and forcibly circulated and the dead smoke forcibly expelled.

Specifically the principal feature of my invention results in the elimination of the dead smoke before the dead smoke has produced the objectionable effect above pointed out.

Figure 1 is a side elevation of a plant for smoking fish, the plant being provided with an apparatus for smoking fish in accordance with the principles of my invention, parts being broken away and shown in section, the view being taken looking in the direction indicated by the arrows 1 in Figs. 2 and 4.

Fig. 2 is a vertical cross section upon an enlarged scale and taken on the lines 2—2 of Figs. 1, 4 and 5.

Fig. 3 is a fragmentary vertical longitudinal sectional detail on a plane parallel with Fig. 1 and taken on the line 3—3 of Fig. 2.

Fig. 4 is a horizontal sectional detail on the lines 4—4 of Figs. 1, 2 and 5.

Fig. 5 is a vertical longitudinal sectional detail on a plane parallel with Fig. 1 and on the line 5—5 of Fig. 4, parts being broken away to economize space.

Fig. 6 is a fragmentary view analogous to Fig. 5 and showing a modified form of the exhaust fan construction.

Fig. 7 is an enlarged fragmentary horizontal section through the heating chamber, the view being taken on the lines 7—7 of Figs. 5 and 8.

Fig. 8 is an enlarged fragmentary vertical longitudinal sectional detail on a plane parallel with Fig. 5 and on the lines 8—8 of Figs. 7 and 9, and looking in the direction indicated by the arrows.

Fig. 9 is a vertical cross section on the line 9—9 of Fig. 8.

Fig. 10 is an enlarged fragmentary vertical cross section on the lines 10—10 of Figs. 5 and 11, and looking in the direction indicated by the arrows.

Fig. 11 is a vertical longitudinal sectional detail on the line 11—11 of Fig. 10 and looking in the direction indicated by the arrows.

Fig. 12 is a fragmentary perspective detail of the construction shown in Figs. 10 and 11.

The smoke house 1 is of considerable length and has car tracks 2, 3 and 4 running lengthwise. The car track 4 is a branch of the car track 3 and the tracks 2 and 3 run through both ends of the smoke house. The openings through which the cars pass are closed by doors 5, 6 and 7. The cars 8 run upon the car tracks 2, 3 and 4 and have shelves 9 to receive the trays of fish. Windows 10 are formed at suitable intervals in the sides of the smoke house 1 for inspecting the operation of drying and smoking the fish, and similar windows 11 are formed in the doors 5, 6 and 7.

The doors 5 and 7 are attached to ropes 12 running upwardly over pulleys 13 and connected to counter-balancing weights, so that the doors may be raised to allow the cars to pass in and out.

The door 6 consists of a lower outer section 14 and an upper inner section 15, and ropes 16 and 17 are connected to the lower section 14 and run upwardly over pulleys 18 and 19 and are connected to counterbalancing weights, so that the ropes may be operated to raise the lower section 14, and when the lower section 14 goes up to the level of the upper section 15 the two sections will continue to go up together. The sections 14 and 15 extend entirely across the end of the smoke house.

Steam radiators 20 are mounted in the front end of the smoke house just inside of the door 6 and in the plane of the center track 4. The steam radiators 20 are connected to the steam boiler 201, which may be of any suitable construction for furnishing steam to heat the radiators. A V-shaped baffle 21 extends downwardly from the ceiling 22, and an A-shaped baffle 23 extends upwardly from the floor 24, there being a passage 25 between the edges of the baffles 21 and 23. The baffles 21 and 23 are directly behind the radiators 20 and the radiators 20 are between the side walls 26 and 27, and the baffles 21 and 23 are connected to the side walls 26 and 27.

A deflector 28 is mounted between the side walls 26 and 27 upon a pivot shaft 29 and normally extends horizontally through the opening 25. The forward part of the deflector has a flat plate 291, and a rod 30 is connected to the forward end of the plate 291 and extends upwardly through the roof 31. A baffle plate 32 extends backwardly and upwardly from the rear edge of the plate 291 and a similar baffle plate 33 extends backwardly and downwardly, the plates 291, 32 and 33 being formed integral.

The rod 30 is controlled by a set screw 301 so that by loosening the set screw 301 and manipulating the handle 302 the rod may be raised or lowered to swing the plates 32 and 33 upwardly or downwardly to throw the draft of air or smoke upwardly or downwardly as desired.

A shaft 281 is mounted vertically in a central position some distance behind the deflector 28, and a deflector plate 282 is fixed upon the shaft 281 and extends forwardly to a point near the rear edges of the plates 32 and 33. A handle 283 is fixed upon the upper end of the shaft 281 above the roof and has a pawl 284 engaging a sector 285 so that by manipulating the pawl 284 and the handle 283 the plate 282 may be turned from one side to the other as required to direct the draft of smoke and air to one side or the other of the smoke house.

A smoke producing furnace 34 is mounted in a pit 35 in front of the smoke house. A pipe 36 extends upwardly from the furnace 34, an elbow 37 is fixed upon the upper end of the pipe 36, a pipe 38 extends from the elbow 37, a damper 39 is mounted in the pipe 38 and a cross pipe 40 is connected to the pipe 38. The discharge or intake pipe 41 extends upwardly from the cross pipe 40 and has a damper 42. The feed pipe 43 is connected to the opposite end of the cross pipe 40 from the pipe 38 and is controlled by a damper 44. The feed pipe 43 is mounted upon supports 45 and is connected to a flange 46 fitting against the door section 14, there being openings 47 through the door sections through which the pipe 43 discharges when the door sections are in closed position.

A blower 48 is connected to the pipe 41 below the damper 42 and to the pipe 43 behind the damper 44, so as to take air or smoke from the pipe 41 and discharge it through the pipe 43 into the radiator chamber 49 and from the radiator chamber through the opening 25 into the drying and smoking chamber 50.

A casing 51 is mounted between the doors 5 and 7 and has a chamber 52 and an inlet opening 53. The inlet opening 53 extends from the bottom to the top of the chamber 50. A slat shutter 54 is mounted in the casing 51 so as to regulate and distribute the draft from the chamber 50 to the chamber 52.

Referring to Figs. 10, 11 and 12, the shutter 54 has slats 541 and pintles 542 extending from the ends of the slats into the side boards 543 and 544 of the casing 51 and the slats are evenly spaced so that when in substantial vertical positions the shutter is closed and when in horizontal positions the shutter is open. A shutter operating bar 545 extends downwardly through the roof just inside of the side board 544 and pins 546 are inserted through the bar 545 into the ends of the slats 541. A handle 547 is formed upon the upper end of the bar 545. The bar 545 slides through a bearing 548 fixed upon the roof and is controlled by a set screw 549 mounted in the bearing so that when the set screw is loosened and the handle 547 manipulated to raise or lower the bar 545 the shutter 54 is opened or closed or adjusted and then by tightening the set screw 549 the shutter is held in its adjusted position.

The hood 55 extends through the end wall of the smoke house and communicates with the chamber 52. A pipe 56 leads from the hood 55 and is controlled by a damper 57.

An exhaust fan 58 is connected to the pipe 56, and a return pipe 59 connects the discharge end of the exhaust fan 58 to the lower end of the cross 40.

In Fig. 5 I have shown a centrifugal exhaust fan 58, and in Fig. 6 I have shown a propeller fan 60. The specific type of blower or fan is not essential.

In the practical operation the fish are prepared and placed in trays and placed upon the shelves in the cars 8, and the cars are moved into the smoke house upon the tracks 2, 3 and 4. The doors 5, 6 and 7 are closed, the radiators 20 are heated, the damper 39 is closed, the damper 42 is opened, the damper 44 is opened, and the fans 48 and 58 are started.

Fresh air is drawn downwardly through the pipe 41 and discharged into the chamber 49 around the radiators 20, and from the chamber 49 the air is discharged through the opening 25 to the chamber 50. The blower 48 forces the air into the chamber 50 and the fan 58 or 60 pulls the air through the chamber 50 and discharges it back through the pipe 59 to the cross 40 and then through the pipe 43 and the air continues to circulate through the chamber 50 until the fish are properly dried and ready for smoking; after which the furnace 34 is started to produce smoke, the damper 39 is opened, the damper 42 closed, and the smoke is circulated through the chamber 50 around and around to the desired extent and until the smoke threatens to become dead or stale; then the damper 44 is closed, the damper 39 closed, the damper 42 opened, the windows 11 opened and fresh air will pass inwardly through the windows to be circulated through the chamber 50 and the stale dead smoke exhausted up the pipe 41; then the windows 11 are closed, the damper 39 opened, the damper 42 closed, the damper 44 opened and the smoking process continues.

Various changes may be made without departing from the spirit of my invention as claimed.

I claim:

1. In an apparatus for smoking fish, a smoke house having a smoke chamber and a radiator chamber communicating with the smoke chamber through a small central passage of baffles mounted transversely behind the passage and adapted to swing up and down to regulate the direction of flow through the passage; radiators in the radiator chamber; a pipe discharging into the radiator chamber; a damper in the pipe; a cross at the outer end of the pipe; a furnace connected to the outer end of the cross; a damper for controlling the furnace; an intake and discharge pipe connected to the outer end of the cross; a damper in the intake and discharge pipe; a blower connecting the intake and discharge pipe below the damper to the first pipe behind the damper; a suction fan at the rear end of the smoking chamber; and a pipe connecting the discharge end of the suction fan to the lower end of the cross.

2. An apparatus for smoking fish, comprising a smoke house construction of a smoke furnace; a pipe leading from the smoke furnace; a damper in the smoke furnace pipe; a cross connected to the smoke furnace pipe; an inlet and discharge pipe connected to the upper end of the cross; a damper in the inlet and discharge pipe; a feed pipe connected to the opposite end of the cross from the smoke pipe; a damper in the feed pipe; a blower connected to the inlet and discharge pipe below the damper and to the feed pipe behind the damper, the feed pipe discharging into the front end of the smoke house; a suction fan connected to the rear end of the smoke house; and a pipe connecting the discharge end of the suction fan to the lower end of the cross.

3. In an apparatus for smoking fish, a smoke house having a chamber adapted to receive fish; means within the chamber forming a heating chamber; a heater in the heating chamber; means for discharging air or smoke into the heating chamber; and adjustable means for directing the draft of air or smoke upwardly or downwardly of said heating chamber.

4. In an apparatus for smoking fish, a smoke house having a chamber adapted to receive fish; means within the chamber forming a heating chamber; a heater in the heating chamber; means for discharging air or smoke into the heating chamber; and adjustable means for directing the draft of air or smoke to one side or the other of said heating chamber.

In testimony whereof I have signed my name to this specification.

J. W. MARR.